Dec. 13, 1949  H. C. ENGELKE  2,491,256
CABLE SPLICING JIG
Filed Feb. 19, 1947  2 Sheets-Sheet 1
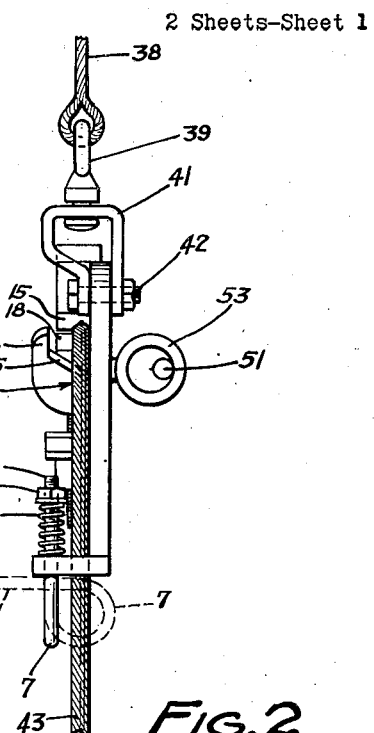
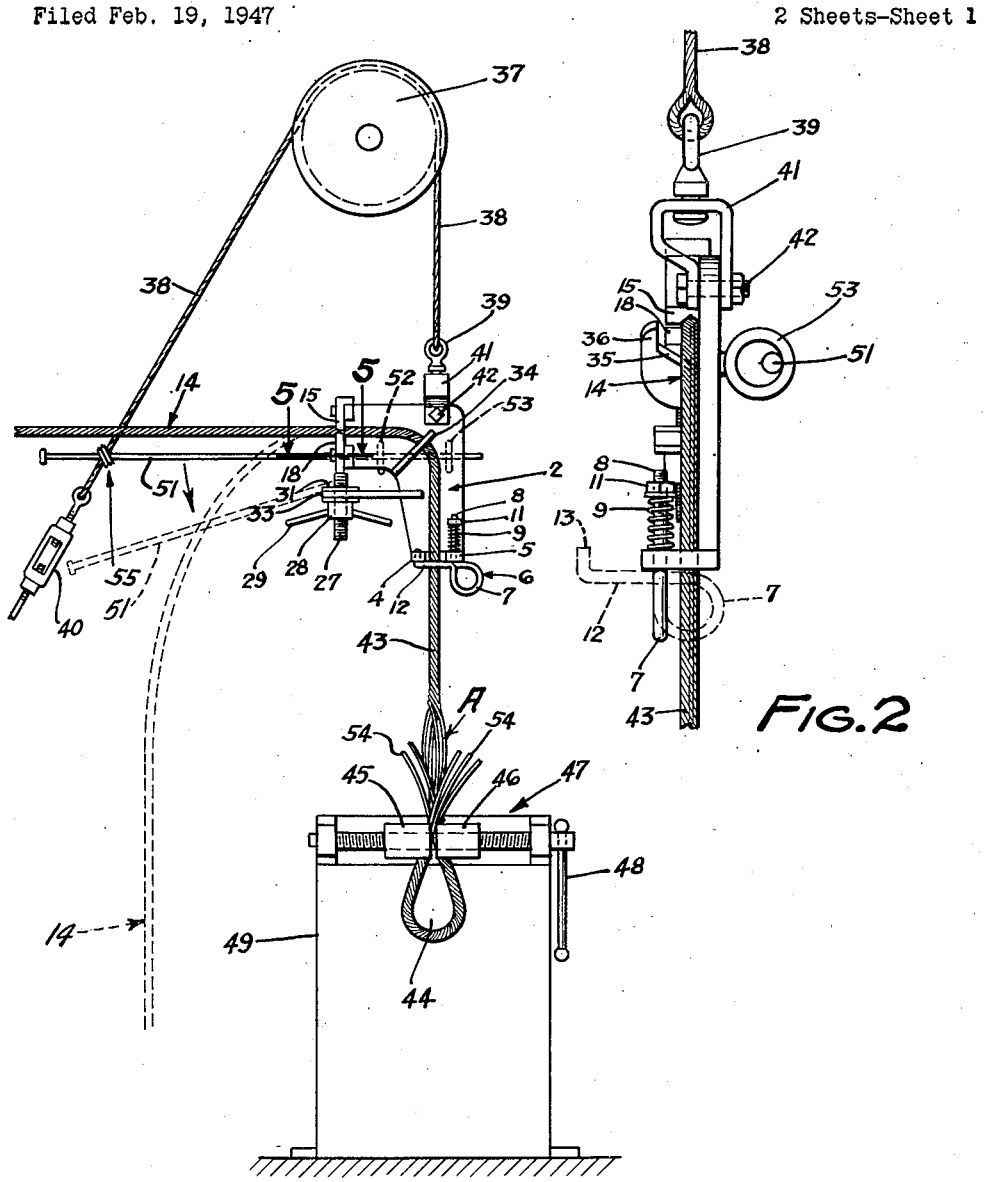
Fig.2
Fig.1
INVENTOR.
HENRY C. ENGELKE
BY Paul, Paul & Moore
ATTORNEYS Dec. 13, 1949 H. C. ENGELKE 2,491,256
CABLE SPLICING JIG
Filed Feb. 19, 1947 2 Sheets-Sheet 2
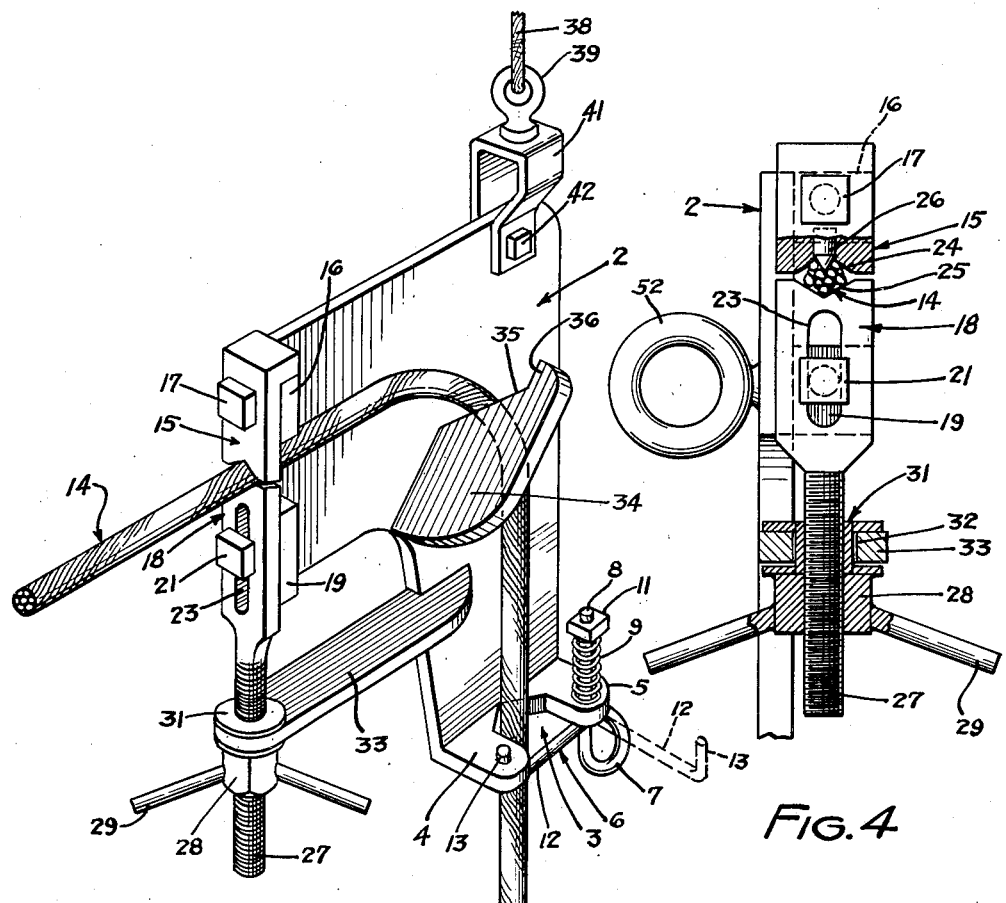
INVENTOR.
HENRY C. ENGELKE
BY
Paul, Paul & Moore
ATTORNEYS Patented Dec. 13, 1949

2,491,256

UNITED STATES PATENT OFFICE 2,491,256

CABLE SPLICING JIG

Henry C. Engelke, Bluffton, Minn.

Application February 19, 1947, Serial No. 729,441

10 Claims. (Cl. 57—23)

This invention relates to new and useful improvements in apparatus for splicing stranded steel cables, and more particularly to a jig for holding a portion of the cable whereby the operation of making the splice is greatly facilitated.

It is well known that two ends of a stranded steel cable may be spliced together by partially unwinding the strands of the two cable ends, and then threading or weaving said strand ends between the partially unwound strands of the cable end portions, after which the partially completed spliced joint of the cable is tightly wound to setlock the strands to thereby complete the formation of the splice. An eye or loop may be similarly formed at the end of a cable by unwinding the end portions of the steel strands and then untwisting a portion of the cable adjacent to the end thereof for the purpose of separating the strands of the cable so that the free ends of the strands may be threaded therebetween, after which the cable is twisted to restore the partially untwisted portion of the cable to its normal condition, whereby the strand ends become firmly interlocked with other strands of the cable to effect a permanent splice.

To perform such splices in a cable, means must be provided for securely holding the portions of the cable to be spliced, and the present invention relates particularly to an improved form of jig adapted for this purpose.

An object of the invention therefore is to provide a cable splicing jig comprising a suitable body, which, for economy, may be made from flat stock such as a boiler plate, said body having cooperating jaws mounted thereon for gripping and securing the cable thereto, and a suitable guide being provided on said body in spaced relation to said jaws with its axis disposed at an angle to the gripping faces of the jaws, whereby the portion of the cable secured in the jig will be disposed at an angle, thereby greatly minimizing the danger of the cable relatively twisting in the jig, when the cable is twisted to unwind its strands or to twist the cable in a direction to tightly wind its strands at the splice to complete the formation of the splice.

A further object is to provide a cable splicing jig which is extremely simple and inexpensive in construction and which is so constructed that the cable may be quickly engaged therewith and secured in position therein with a minimum of time and effort.

A further object is to provide a jig of the class described comprising a fixed jaw and a relatively movable jaw adapted to engage and firmly secure a cable in position in the jig, and one of said jaws having means thereon adapted to separate and enter between the strands of the cable to thereby positively prevent rotation of the cable in said jaws.

A further object is to provide a cable splicing jig comprising a flat body provided with a pair of coacting jaws adapted to engage and secure a cable to said body, and a guide being provided on said body in spaced relation to the jaws, and a lug extending outwardly from one side of said body and disposed between said jaws and guide and with which the cable is engaged when secured in the jig, said lug and the arrangement of said guide with respect to the jaws, being such that the portion of the cable engaged with the jig will be disposed at an angle, thereby eliminating all danger of the cable relatively twisting in said jig.

A further object is to provide a cable splicing jig which may be suspended from an overhead member to support the portion of the cable to be spliced in a vertical position, and which jig may also, if desired, be supported in a position to hold the portion of the cable to be spliced in a horizontal position.

Other objects of the invention reside in the arrangement and construction of the various parts of the jig which are such that an inexperienced operator may quickly and expeditiously secure a cable in the jig preparatory to making a splice therein; in the provision of such a splicing jig which does not require the use of chains or other separate means for supporting the cable in position while forming the splice; in the unique construction of the coacting jaws and the means provided for manipulating the movable jaw whereby said jaw may be quickly moved into clamping engagement with the cable or out of clamping engagement therewith by the simple manipulation of a suitable hand wheel or grip; in the construction of the guide provided on the jig which may be quickly opened to permit insertion of the cable therein or the removal of the cable therefrom; and in the means provided at the back of the jig for receiving the usual slacker bar used for rotating the jig to unwind the strands of the cable in preparation for making the splice, or for twisting the cable in a direction to tightly wind the strands into their normal positions to complete the formation of a splice.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a view showing the jig suspended from an overhead support with one end portion of a cable secured therein, the free end of said cable being gripped between the jaws of a vise in preparation to forming a loop or eye in the end of the cable;

Figure 2 is an end view of Figure 1, on an enlarged scale, with some of the parts omitted;

Figure 3 is a perspective view of the jig showing a cable secured therein;

Figure 4 is an end view of Figure 3, partially broken away to more clearly illustrate the construction of parts thereof, and also showing the means provided on the back of the jig for receiving the usual slacker bar; and Figure 5 is an enlarged detail sectional view on the line 5—5 of Figure 1, showing the means for supporting the movable jaw on the jig body.

The novel cable splicing jig herein disclosed is shown comprising a suitable body, generally designated by the numeral 2, which, for the sake of economy, may be made from boiler plate or other flat steel stock to minimize machine operations. It is preferably shaped substantially as shown in Figures 1 and 3, and is provided at its lower end with a suitable cable guide 3, shown formed by offsetting the lower end portion of the body 2 to provide spaced lugs 4 and 5, disposed at substantially right-angles to the plane of the body 2. If desired, the lugs 4 and 5 may be formed independently of the body 2 and then secured thereto by welding or other suitable means.

A spring-actuated latch 6 is mounted in the lug 5, and may be formed by bending a wire or small rod to form a loop 7 having an upright end 8 which extends upwardly through an aperture in the lug 5 and has a spring 9 coiled thereabout. One end of the spring is seated on the lug 5 and its opposite end against a nut or collar 11, suitably secured to the upper end of the rod or stem 8, whereby the spring constantly urges the latch 6 in an upward direction, when viewed as shown in Figure 3.

The horizontal portion 12 of the latch 6 is adapted to close the guide 3, as shown in Figure 3, and has an upturned end portion 13 receivable in an aperture provided in the lug 4, whereby the latch may be retained against accidental opening.

Means is provided at the upper portion of the body 2 for gripping the stranded cable 14 to be spliced, and consists of a fixed jaw 15 which is detachably secured to an offset portion 16 of the body 2 by such means as a cap screw 17. A movable jaw 18 is shown mounted directly beneath the fixed jaw 15 and is slidably supported on an offset portion 19 of the body 2 by a suitable cap screw or stud 21, which preferably is shouldered as shown at 22 to provide free sliding movement of the jaw 18. The jaw 18 has a suitable slot 23 therein to provide free sliding of the movable jaw 18.

An important feature of the invention resides in the construction of the gripping faces of the jaws 15 and 18, whereby the cable gripped therebetween will be so supported that it is not likely to relatively rotate when gripped by the two jaws. As best shown in Figure 4, the jaws 15 and 18 are provided with opposed V-shaped gripping faces 24 and 25, respectively, and, in addition, the fixed jaw 15 is shown provided with a spur 26 whose sharpened terminal will penetrate into the cable between its strands, when the cable is gripped between the two jaws, as shown in Figure 4.

The movable jaw 18 has a threaded shank 27 received in threaded engagement with a suitable nut 28 provided with finger-engaging elements 29 to facilitate rotating the nut 28. To support the nut against up-and-down or axial movement, and whereby rotation of the nut will impart movement to the jaw 18, the nut 28 is shown secured to a flanged element 31 rotatably received in an aperture 32 provided in a horizontally disposed arm or member 33, shown forming a part of the body 2, as will be understood by reference to Figures 1 and 3. By this arrangement it will readily be noted that when the nut 28 is rotated, the threaded stem 27 of the movable body will be axially translated relative to its supporting member 33, whereupon the jaw 18 will be moved towards or away from the fixed jaw 15, depending on the direction of rotation of the nut 28.

Another important feature of the invention resides in the means provided on the body 2 whereby the portion of the cable which is engaged with the jig is disposed at an angle, thereby to minimize relative rotation of the cable in the jig, when the jig is rotated for the purpose of partially unwinding a portion of a cable in preparation to making a splice therein, and in the subsequent operation of twisting the cable to complete the formation of a splice.

To thus support the cable at an angle in the jig, the guide 3, it will be noted, has its axis disposed at substantially right angles to the coacting gripping faces of the jaws 15 and 18, as best shown in Figure 3. To facilitate engaging the cable with the jig, a laterally extending lug or cable-supporting element 34 is shown secured to the front side face of the body 2, directly above the guide 3, and at an elevation slightly below the gripping faces of the jaws. The lug 34 is fixedly secured to the body 2 and has its upper edge 35 inclined as shown and terminating at its upper end in a terminal portion 36 which serves to assist in retaining the cable in position on the lug 34, in the operation of applying the jig to the cable.

Stranded steel cables, particularly the larger sizes, and more or less stiff and it might therefore, be rather inconvenient to secure the jig to a right angle bend in the cable if it were not for the lug 34, shown in Figure 3. The lug 34 greatly simplifies this operation in that the cable may readily be engaged with the lug 34 after which one end may be engaged with the jaws 15 and 18 and its opposite end portion moved into the guide 3, when the latter is in open position, as indicated by the dotted lines in Figures 2 and 3.

In Figure 1 the jig is shown suspended from a suitable support 37 preferably in the form of a sheave having a cable 38 engaged therewith to one end of which a suitable swivel 39 is secured comprising a clevis 41 which is pivotally connected to the body 2 of the jig by such means as a bolt 42. The opposite end of the tension cable 38 may be secured to one end of a turnbuckle 40, whose opposite end may, if desired, be operatively connected to a suitable winding drum, not shown in the drawings, whereby the cable 38 may be manipulated to tension the lower portion 43 of the stranded cable in which the splice is to be made.

When it is desired to form a loop or eye in the end of a stranded steel cable, the end of the cable is bent upon itself to form a loop or eye 44, as shown in Figure 1. The folded end of the cable is then secured between the jaws 45 and 46 of a suitable vise, generally indicated by the numeral 47, provided with a suitable operating bar or handle 48, as is customary in devices of this general type. The vise 47 may be secured to a suitable supporting structure or table, indicated by the numeral 49, which is anchored to the floor so that the portion 43 of the cable may be placed under tension by tightening the tension cable 38, if desired.

To complete the formation of the eye 44, the tension in the portion 43 of the cable is slackened, and the jig is then rotated about the vertical axis of the swivel 39 by inserting a suitable bar 51, commonly known as a "slacker" bar, through suitable loops or eye bolts 52 and 53, shown secured to the back face of the body 2 of the jig. Such rotation of the jig in the proper direction, will cause the strands of the cable to unwind sufficiently to permit the operator to insert the free ends 54 of the unwound cable strands between the partially untwisted strands of the cable, as indicated at A in Figure 1, and as is well known in the art. The cables 38 and 43 are sufficiently slack to permit the slacker bar to be depressed or swung downwardly, as indicated in dotted lines in Figure 1, to thereby permit it to readily clear the inclined portion of the supporting cable 38.

After the free ends 54 of the cable strands have been interwoven between the partially untwisted strands of the cable section 43, the cable 38 is manipulated to release the tension in the cable portion 43, and at the same time, the jig may be rotated in a direction to tightly wind or restore the strands of the cable portion 43 to their normal condition, whereupon the splice is completed, as will be understood.

To prevent the jig from relatively rotating after the cable 43 has been partially unwound or untwisted, in the operation of making a splice, the slacker bar 51 may have its outer end temporarily engaged with or tied to the cable 38, as shown at 55 in Figure 1.

In some instances, it may be found more practical to make a splice in the cable when the cable is supported in a horizontal position. In such cases the tension cable 38 will also be supported in a horizontal position, whereby when attached to the jig through the swivel 39, the jig will be supported between the tension cable 38 and cable section 43 with the guide 3 and swivel 39 disposed in substantially a horizontal position. In other words, it will be noted that the guide 3 is substantially axially aligned with the swivel 39, whereby the jig may be supported in any desired portion during the operation of making a splice in the cable, as will be understood.

The novel cable splicing jig herein disclosed is simple in construction and it is so designed that it may be quickly and readily applied to a cable, as shown in Figure 3, in a minimum of time. When the cable to be spliced is thus secured in the jig, a splice may be quickly made therein as will be understood by reference to Figure 1. It provides a substantial support for the cable during the splicing operation, and, in addition, it is compact and comparatively light in weight whereby it may readily and conveniently be transported about from place to place, which is a highly advantageous attribute in a device of this general character. Because of the unique construction of the jaws and the angular disposition of the cable portion engaged with the jig, the cable is firmly held against relative rotation whereby very few turns are necessary in the cable portion 43 to unwind the strands thereof to form the necessary splice. Its construction is also such that it might be used with any desired form of vise 47 or supporting cable 38.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. A cable splicer comprising a plate-like body, means for movably supporting said body, a fixed jaw secured to said body adjacent to one side thereof, a movable jaw adapted to coact with said fixed jaw to grip a cable to be spliced, a cable guide spaced from said jaws and having its axis disposed at an angle to the gripping faces of said jaws, and a cable engaging element fixed to the splicer body between the jaws and said guide for retaining the cable portion between said jaws and guide at a predetermined angle, thereby to minimize relative rotation of the cable in the splicer, when making a splice in the cable.

2. A cable splicer comprising a body, complemental jaws mounted on said body and adapted to grip a cable, a guide on the body spaced from said jaws, said guide having its axis disposed at substantially right angles to the axis of said jaws, and means between the jaws and said guide over which the cable passes, and whereby the portion of the cable disposed between the jaws and said guide will have a bend therein to minimize relative twisting of a cable supported in the splicer, when making a splice in the cable.

3. A cable splicer comprising a body, complemental jaws mounted in the upper portion of said body with their axis substantially horizontally disposed, said jaws being adapted to grip a cable, a guide secured to the lower portion of said body and having its axis disposed at substantially right angles to the axis of the jaws, and a lateral projection on said body between the jaws and said guide for engaging the cable, and whereby the portion of the cable disposed between the jaws and said guide will have substantially a right angle bend therein to minimize relative twisting of a cable supported in the splicer, when making a splice in the cable.

4. A cable splicing jig comprising a body, complemental jaws mounted on the upper portion of said body with their axis substantially horizontally disposed, said jaws being adapted to grip a cable, a vertically disposed guide on said body spaced from said jaws, and a lateral projection on the body between the jaws and said guide for engaging the cable, said projection being so located relative to said jaws and guide that a bend is imposed in the portion of the cable disposed between the jaws and said guide thereby to minimize relative twisting of the portion of the cable supported in the jig, and means whereby the jig may be rotated to twist the portion of the cable to be spliced, thereby to condition it for splicing.

5. A cable splicing jig comprising a body, complemental jaws mounted on the upper portion of said body adapted to grip a cable, a guide on said body spaced from said jaws, a lateral projection on said body between the jaws and said guide for engaging the cable, and the axis of said jaws being disposed at an angle to the axis of the guide whereby the portion of the cable disposed between the jaws and said guide will have substantially a right angle bend therein to minimize relative twisting of the portion of the cable supported in the jig, and a spring-actuated latch for retaining the cable in said guide.

6. A cable splicing jig comprising a body, complemental jaws mounted on the upper portion of said body and adapted to grip a horizontally disposed cable portion, a vertically disposed guide secured to the lower portion of said body and spaced from said jaws, an outwardly projecting lug on said body between the jaws and said guide for engaging the cable, and whereby the portion of the cable disposed between the jaws and said guide will have a right angle bend therein as a result of the angular relationship between the jaws and said guide, thereby to minimize relative twisting of the cable in said jaws, and means in one of said jaws adapted to bite into the cable between the strands thereof thereby to prevent relative rotation of the cable between said jaws.

7. A cable splicing jig comprising a flat body complemental jaws mounted on said body adapted to grip a cable to be spliced, a guide on said body spaced from said jaws and having its axis disposed at an angle to the axis of said jaws, a fixed element extending outwardly from said body between the jaws and said guide for engaging the cable, said element being so located relative to said jaws and guide that a bend must be made in the cable to pass over said element, thereby to prevent twisting of the cable in the jig when making a splice, a spring actuated latch for retaining the cable in said guide, means for supporting the jig whereby it may be rotated to impart a twisting action to a cable supported therein for splicing, and means on one of said jaws adapted to bite into the cable between the strands thereof when the jaws are tightened to grip the cable, thereby to prevent relative rotation of the cable between said jaws.

8. A cable splicing jig comprising a flat body, complemental jaws and having its axis disposed at an angle to the axis of said jaws mounted on said body adapted to grip a cable to be spliced, a guide on said body spaced from said jaws, to said body between the jaws and said guide over which the cable must pass, said lug being so located relative to the jaws and guide that a bend is imposed in the portion of the cable engaging said lug, thereby to minimize relative twisting of the cable in the jig, a latch for retaining the cable in said guide, and a spur in one of said jaws adapted to bite into the cable between the strands thereof when the jaws are tightened to grip the cable, thereby to prevent relative rotation of the cable between said jaws.

9. A cable splicing jig comprising a body, complemental jaws mounted on said body adapted to grip a cable to be spliced, a guide on said body spaced from said jaws and having its axis disposed at an angle to the gripping faces of the jaws, a lateral projection on said body between the jaws and said guide for engaging the cable, said lug being so disposed relative to the jaws and guide that the portion of the cable disposed between the jaws and said guide will have a bend therein to minimize relative twisting of the portion of the cable supported in the jig, a spring-actuated latch for retaining the cable in said guide, and swivel means for supporting the jig whereby it may be rotated to impart a twisting action to the portion of the cable to be spliced.

10. A cable splicing jig comprising a body, complemental jaws mounted on said body adapted to grip a cable to be spliced, a guide on said body spaced from said jaws and having its axis disposed at an angle to the gripping faces of the jaws, a lateral projection on said body between the jaws and said guide for engaging the cable, said lug being so disposed relative to the jaws and guide that the portion of the cable disposed between the jaws and said guide will have a bend therein to minimize relative twisting of the portion of the cable supported in the jig, a spring-actuated latch for retaining the cable in said guide, swivel means for supporting the jig whereby it may be rotated to impart a twisting action to a cable supported therein for splicing, and a spur in one of said jaws adapted to bite into the cable between the strands thereof when the jaws are tightened to grip the cable, thereby to prevent relative rotation of the cable between said jaws.

HENRY C. ENGELKE.

REFERENCES CITED

The following references are of record in the file of this patent:

UNITED STATES PATENTS

| Number | Name | Date |
|---|---|---|
| 1,035,388 | Wilson et al. | Aug. 13, 1912 |
| 2,384,992 | Garlinghouse | Sept. 18, 1945 |

Certificate of Correction

Patent No. 2,491,256

December 13, 1949

HENRY C. ENGELKE

It is hereby certified that errors appear in the printed specification of the above numbered patent requiring correction as follows:

Column 7, lines 54 and 55, strike out "and having its axis disposed at an angle to the axis of said jaws" and insert the same after the word "jaws" and before the comma in line 57;

and that the said Letters Patent should be read with these corrections therein that the same may conform to the record of the case in the Patent Office.

Signed and sealed this 16th day of May, A. D. 1950.

[SEAL]

THOMAS F. MURPHY,
*Assistant Commissioner of Patents.*